US006323813B1

(12) United States Patent
Neat

(10) Patent No.: US 6,323,813 B1
(45) Date of Patent: Nov. 27, 2001

(54) COMMUNICATION SYSTEM AND METHOD

(75) Inventor: Richard L. Neat, Millersville, MD (US)

(73) Assignee: Aeronautical Radio, Inc., Annapolis, MD (US)

( * ) Notice: Subject to any disclaimer, the term of this patent is extended or adjusted under 35 U.S.C. 154(b) by 0 days.

(21) Appl. No.: 09/373,209

(22) Filed: Aug. 12, 1999

(51) Int. Cl.[7] .......... H04Q 7/08

(52) U.S. Cl. .......... 343/705; 343/706

(58) Field of Search .......... 343/705, 706, 343/711, 713, 702, 718, 844

(56) References Cited

U.S. PATENT DOCUMENTS

| | | | | |
|---|---|---|---|---|
| 3,004,153 | | 10/1961 | Alford | 250/13 |
| 3,683,281 | * | 8/1972 | Watts | 325/312 |
| 4,336,543 | | 6/1982 | Ganz et al. | 343/705 |
| 4,412,221 | | 10/1983 | Stapleton | 343/705 |
| 5,111,213 | * | 5/1992 | Jahoda et al. | 343/722 |
| 5,654,724 | | 8/1997 | Chu | 343/742 |

* cited by examiner

*Primary Examiner*—Don Wong
*Assistant Examiner*—James Clinger
(74) *Attorney, Agent, or Firm*—Oliff & Berridge, PLC.

(57) ABSTRACT

An antenna system and method of improving radio frequency isolation in such a system positioned on a hull of a vessel includes a first antenna that transmits a signal having a wavelength. The antenna system also includes a second antenna which is positioned away from the first antenna on the hull by half a perimeter of the hull offset by approximately an odd multiple of one quarter wavelength of the signal transmitted by the first antenna.

16 Claims, 4 Drawing Sheets

COMMUNICATION SYSTEM AND METHOD

BACKGROUND OF THE INVENTION

1. Field of Invention

This invention relates generally to communication systems and methods. More particularly, this invention relates to communication systems and methods for communicating with a moving vessel.

2. Description of Related Art

Avionics (aviation electronics) systems perform many functions. For both military and civil aircraft, avionics are used for flight controls, guidance, navigation, communications and surveillance. An ever-increasing portion of avionics equipment is being dedicated to communications. Much of the increase comes in the form of digital communications equipment for either digitized voice or data transfer. Military aircraft typically use digital communications to improve security. Civil aircraft use digital communications to transfer data for improved efficiency of operations and radio frequency (RF) spectrum utilization. Regardless of the rationale for implementing digital communication technology, both the civil and military arenas are focusing more on enhanced communications to fulfill the requirements for better operational capability.

The requirements for digital communications for civil aircraft have grown so significantly that the industry, as a whole, has embarked on a virtually total upgrade of the communications systems elements. The goal is to achieve a high level of flexibility in processing various types of information as well as attain compatibility between a wide variety of communications devices. Bandwidth availability poses a special problem for aircraft designers due to weight and electromagnetic interference (EMI) considerations. Generally, a single unit, commonly identified as a communications management unit (CMU), will perform buffering and distribution of the information received by the aircraft. The CMU can receive information via RF transceivers operating in conjunction with terrestrial, airborne, or space-based transceivers. Additionally, it is often advantageous to have several antennas operating on the same vessel or building.

FIG. 1 is a schematic partial cross-sectional view of an aircraft incorporating an antenna system according to the prior art. In FIG. 1, a fuselage 100 of an aircraft 10 bears a right wing 110 and a left wing 120, an upper antenna 140 and a lower antenna 130. Antennas 130 and 140 are placed on opposite sides of the fuselage aircraft, in order to provide additional electrical isolation between them by virtue of the electrical shielding effect of the intervening metal. Antennas 130 and 140 are placed symmetrically about the circumference of the fuselage 100; the top-mounted antenna 140 is the counterpart of antenna 130 which is mounted on the bottom of the fuselage 100.

The fuselage 100 of the aircraft 10 contains a first transceiver 141 electrically coupled to the upper antenna 140 and a second transceiver 131 electrically coupled to the lower antenna 130. The transceivers 141 and 131 and the antennas 140 and 130 are well known in the art. In this example, transceiver 141 and antenna 140 perform VHF data transmission and reception and transceiver 131 and antenna 130 perform VHF voice radio. However, any other types of transceivers and antennas may be used.

The upper antenna 140 is positioned at the top of the fuselage 100, along the vertical axis (Y) of the fuselage 100. The upper antenna 140 transmits a signal having a wavelength λ.

The lower antenna 130 is positioned at the bottom of the fuselage 100, on the opposite side of the fuselage 100 with respect to antenna 140, along the vertical axis (Y) of the fuselage 100. As a consequence, the distance between the antennas 140 and 130 along the right side of the fuselage is equal to the distance between the antennas along the left side of the fuselage.

The radio wave transmitted by the antenna 140 clockwise, along the fuselage 100 is shown with dashed lines 160. The radio wave transmitted by the antenna 140 counterclockwise along the fuselage 100 is shown with dashed lines 150. Arrow 170 represents the electric field received by antenna 130 from antenna 140 by radiowaves 150 and arrow 180 represents the electric field received by antenna 130 from antenna 140 by radiowaves 160.

FIG. 2 is a schematic side view of an aircraft incorporating an antenna system according to the prior art. As shown in FIG. 2, the aircraft includes a fuselage 100 and wings 110. In order to reduce the interference level between antennas 230 and 240, the distance between those antennas is maximized. Thus, antenna 230 is located proximate to the nose of the aircraft and antenna 240 is located proximate to the tail of the aircraft.

SUMMARY OF THE INVENTION

When two or more radio transceivers are operated simultaneously, the transmissions of one radio transceiver can interfere with the reception of signals by another radio transceiver. The level of interference is dependent upon many factors, including the difference between the frequencies of the transmitted and received signals, receiver selectivity, and both physical and electrical separation of antennas. For example, as shown in FIG. 1, because the distances between antennas 130 and 140 along both sides of the fuselage 100 are equal or approximately so, the signals transmitted by antenna 140 along both sides of the fuselage 100 and received by antenna 130 are in phase. Therefore, a constructive interference occurs between the two radiowaves 150 and 160, resulting in a high level of noise on antenna 130 produced by the signals emitted by antenna 140. This is represented by arrows 170 and 180 extending along the same direction. Also, as shown in FIG. 2, because antennas 230 and 240 are both positioned on a symmetrical vertical plane, the constructive interference explained above still occurs.

Recent technological advances in air-ground communications have aggravated the need for improved radio frequency isolation between multiple very high frequency (VHF) transceivers on board a mobile vessel. The interference potential between a VHF data radio and a VHF voice radio is significantly greater than that between two voice radios. This increased potential is primarily due to the broader bandwidth of data emissions in comparison to those of voice transmitters.

To permit simultaneous operation of two voice transceivers on board the same vessel, hull manufacturers have attempted to provide as much physical separation between the antennas as practicable. They have also placed antennas on opposite sides of the vessel hull, to provide additional electrical isolation between the antennas by virtue of the electrical shielding effect of the intervening material. FIG. 1 shows an example of a typical antenna placement on a commercial aircraft fuselage. Typically, antennas are placed symmetrically about the circumference of the fuselage or on opposite sides of the vertical stabilizer or other empennage. A top-mounted antenna for one transceiver usually has a counterpart antenna which is mounted on the bottom of the fuselage for the second transceiver. FIG. 2 is a schematic side view of an aircraft incorporating an antenna system according to the prior art, where, as stated above, one antenna is located proximate to the nose of the aircraft and the other antenna is located proximate to the tail of the aircraft. However, both of the antenna mounting practices shown in FIGS. 1 and 2 have had only limited success in permitting simultaneous operation of two VHF radios within the same aircraft.

Thus, this invention relates to methods and systems that provide improved radio frequency isolation between multiple antennas. For example, the antenna system may include a first transmitting antenna and a second antenna positioned away from each other on a hull by half the circumference of the hull, offset by an odd multiple of one quarter wavelength of a signal transmitted by the first antenna.

Alternatively, a first transmitting antenna and a second antenna may be positioned away from each other on a hull by a distance of half of a perimeter of the body offset by a distance between an odd multiple of one quarter wavelength minus one eighth wavelength of a signal transmitted by the first antenna and the odd multiple of one quarter wavelength plus one eighth wavelength of a signal transmitted by the first antenna.

By offsetting one of the antennas from the diametrically opposed position with respect to the other by approximately an odd multiple of one quarter of a wavelength of the signal transmitted by another antenna, the signals generated at the transmitting antennas that follow the shape of the hull by both sides arrive at the other antenna approximately 180° out-of-phase. Thereby a destructive interference occurs between the interference signals traveling along each side of the hull and those signals at least partially cancel each other at the receiving antenna. Therefore, an additional 10 to 30 decibels of antenna isolation can be achieved for a cylindrical hull.

BRIEF DESCRIPTION OF THE DRAWINGS

The invention is described in detail with reference to the following drawings, wherein like numerals represent like elements, and wherein.

DETAILED DESCRIPTION OF PREFERRED EMBODIMENTS

Figure 3:
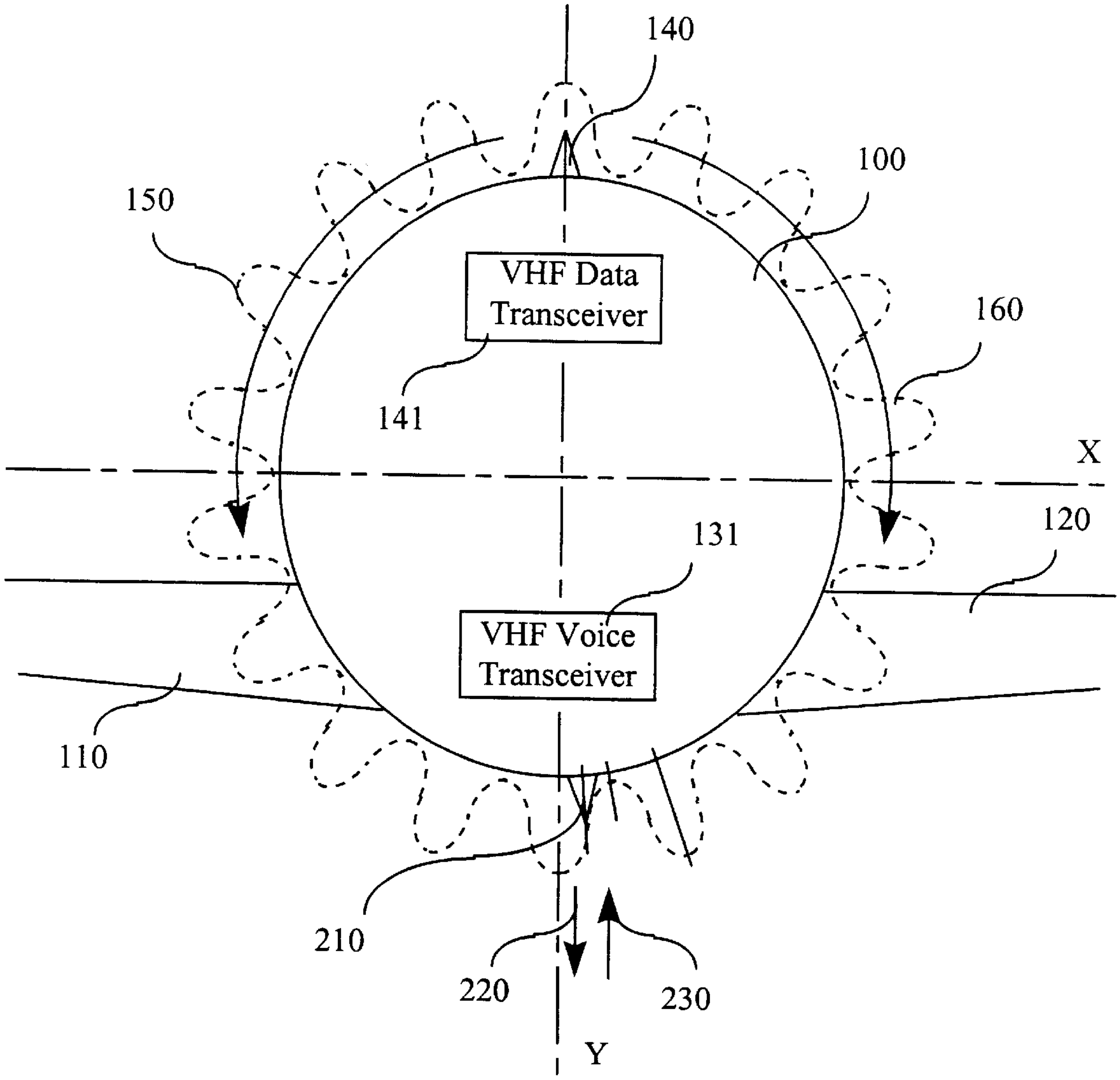
FIG. 3 is a schematic partial cross-sectional view of an aircraft incorporating an antenna system according to a first exemplary embodiment of this invention.

FIG. 3 is a schematic partial cross-sectional view of an aircraft 10 that incorporates an antenna system according to a first exemplary embodiment of this invention. In FIG. 3, the fuselage 100 bears the upper antenna 140 and a lower antenna 210. The upper antenna 140 is positioned at the top of the fuselage 100, along the vertical (Y) symmetrical axis of the fuselage. The upper antenna 140 transmits a signal having a wavelength λ. Antenna 210 is displaced from the Y axis on the bottom of the fuselage 100 by an offset of an odd multiple of one quarter of wavelength λ.

As a consequence, the distance between antennas 140 and 210 traveled counter-clockwise along the side of the fuselage is one half of the perimeter of the fuselage plus one quarter of wavelength λ. The distance between antennas 140 and 210 traveled clockwise along the side of the fuselage is one half of the perimeter of the fuselage minus one quarter of wavelength λ. Accordingly, the differences between the distances between the antennas 140 and 210 along both sides of the fuselage is equal to one half of wavelength λ. Thus, the signals transmitted by antenna 140 along both sides of the fuselage 100 and received by antenna 210 are 180° out of phase and a destructive interference occurs, resulting in a lower level of noise on antenna 210 than would be provided by the prior art system illustrated in FIG. 1.

Arrow 220 represents the electric field received by antenna 210 from antenna 140 by radio waves traveling counter-clockwise along the side of the fuselage 100 and arrow 230 represents the electric field received by antenna 210 from antenna 140 by radio waves traveling clockwise along the side of the fuselage 100. Because the received signals are 180° out of phase, arrows 220 and 230 are extending along opposite directions.

By offsetting the antennas, from diametrically opposed positions with respect to each other by an odd multiple of one quarter of a wavelength, the signals generated at one of the antennas that travel along the sides of the fuselage cancel out each other at the receiving antenna.

Thus, this invention provides improved radio frequency isolation between multiple antennas mounted on the exterior of a fuselage by providing an antenna system comprising a first transmitting antenna and a second antenna positioned away from each other on a fuselage by 180° offset by an odd multiple of one quarter of a wavelength of a signal transmitted by the first antenna.

In the exemplary embodiment shown in FIG. 3, the chosen offset is equal to one quarter of wavelength B. However, the offset may be any odd multiple of the wavelength, for example three, five or seven, multiplied by one quarter of wavelength λ.

However, the energy of the radio wave traveling along the fuselage decreases rapidly. Accordingly, the higher the odd multiple of one quarter wavelength used for offsetting the antennas, the higher the difference of amplitudes between the interfering radio waves and the lower the efficiency of the destructive interference between these radio waves.

Figure 1:
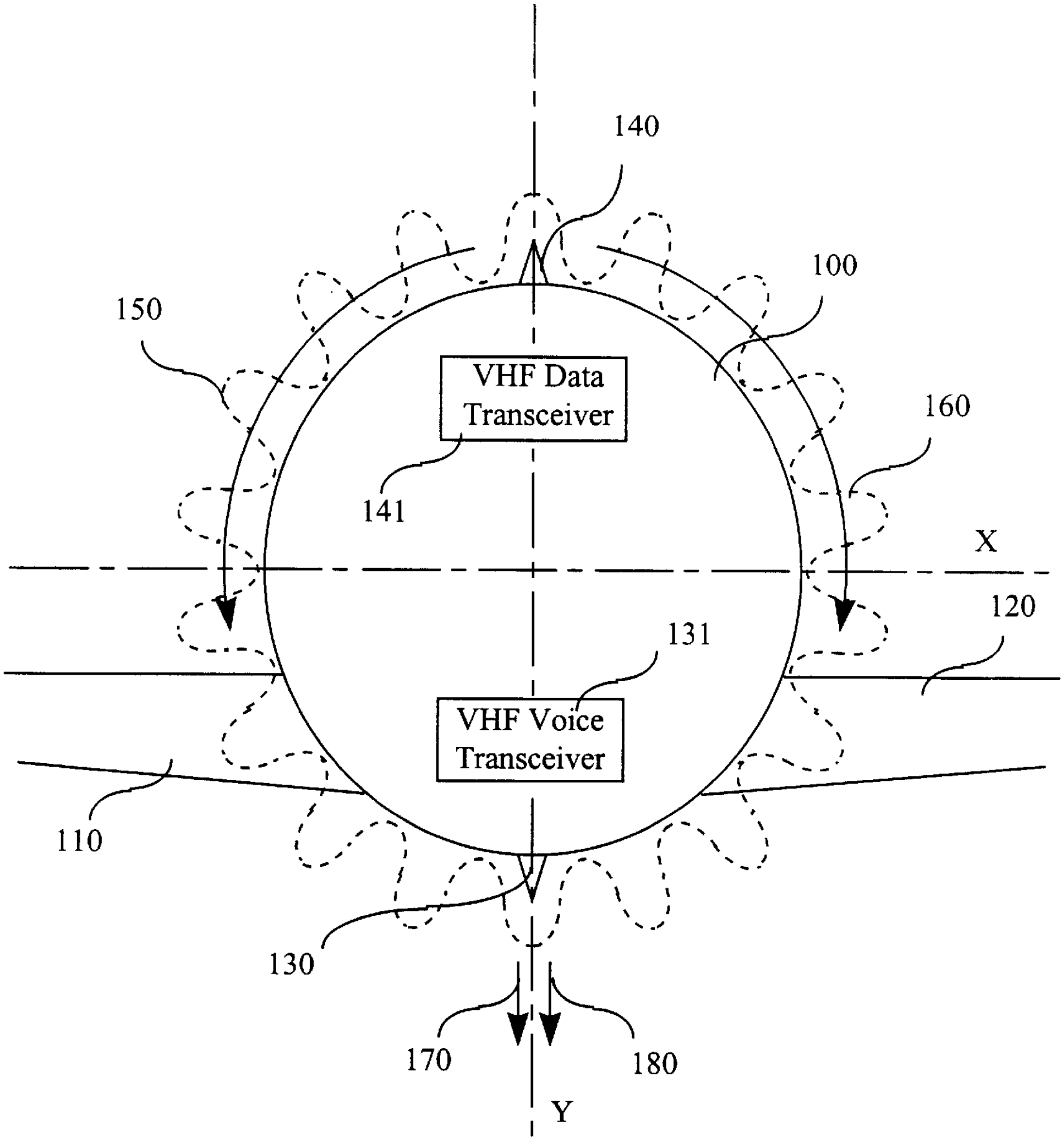
Fig. 1 PRIOR ART
FIG. 1 is a schematic partial cross-sectional view of an aircraft incorporating an antenna system according to the prior art.

It is foreseeable that an additional 10 to 30 decibels of antenna isolation may be achieved by the antenna system according to this invention as shown on FIG. 3, with respect to the prior art antenna system shown on FIG. 1.

Figure 4:
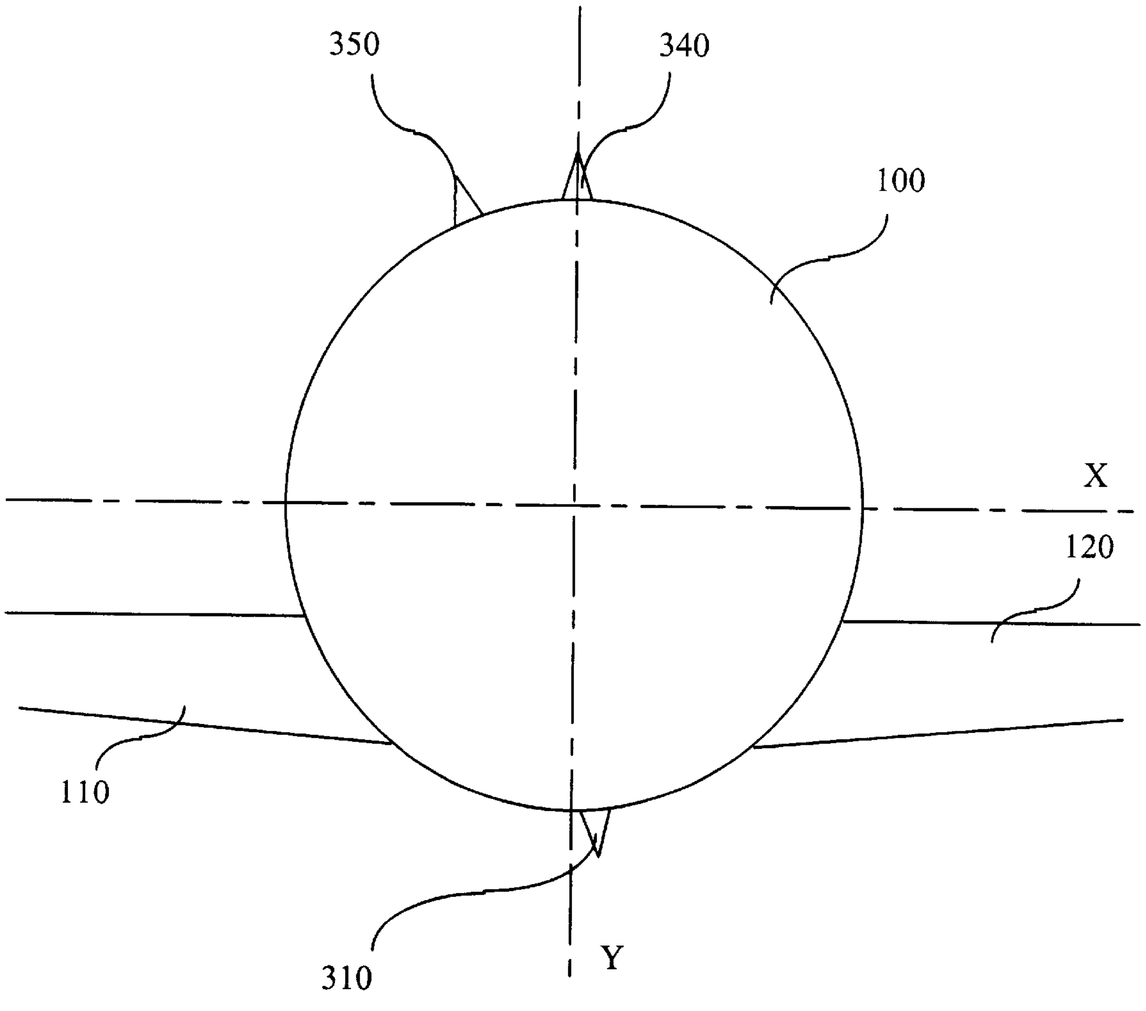
FIG. 4 is a schematic partial cross-sectional view of an aircraft incorporating an antenna system according to a second exemplary embodiment of this invention.

FIG. 4 is a schematic partial cross-sectional view of the same aircraft as shown in FIG. 1, incorporating an antenna system according to a second exemplary embodiment of this invention. In FIG. 4, the fuselage 100 bears two upper antennas 340 and 350 and a lower antenna 310. The upper antenna 340 is positioned at the top of the fuselage 100, on the vertical (Y) axis of the fuselage 100. The upper antenna 350 is positioned offset the top of the fuselage 100. Antenna 340 transmits a signal having a wavelength $\lambda_1$. Antenna 350 transmits a signal having a wavelength $\lambda_2$. Antenna 310 is placed offset from the symmetrical axis (Y) of antenna 340 one quarter of wavelength $\lambda_1$. Antenna 310 is placed offset from the symmetrical axis (Z) of antenna 350 by three quarters of wavelength $\lambda_2$.

As in the second embodiment shown in FIG. 3, the distance between antennas 340 and 310 traveled counter-clockwise along on the side of the fuselage is one half of the perimeter of the fuselage plus one quarter of wavelength $\lambda_1$. The distance between antennas 340 and 210 traveled clockwise along the side of the fuselage is one half of the perimeter of the fuselage minus one quarter of wavelength $\lambda_1$. Accordingly, the differences between the distances between the antennas 340 and 310 along both sides of the fuselage is equal to one half of wavelength $\lambda_1$. Thus, the signals transmitted by antenna 340 along both sides of the fuselage 100 and received by antenna 310 are 180° out of phase and a destructive interference occurs on antenna 310, resulting in a low level of noise due to signals emitted by antenna 340.

The distance between antennas 350 and 310 traveled counter-clockwise along on the side of the fuselage is one half of the perimeter of the fuselage plus three quarters of wavelength $\lambda_2$. The distance between antennas 350 and 310 traveled clockwise along the side of the fuselage is one half of the perimeter of the fuselage minus three quarters of wavelength $\lambda_2$. Accordingly, the difference between the distances between the antennas 350 and 310 along both sides of the fuselage is equal to three halves of wavelength $\lambda_2$. Thus, the signals transmitted by antenna 350 along both sides of the fuselage 100 and received by antenna 310 are 180° out of phase and a destructive interference occurs on antenna 310, resulting in a low level of noise due to signals emitted by antenna 350.

This invention has been described with particularity in connection with specific embodiments. It should be appreciated, however, that other changes can be made to the disclosed embodiment without departing from the inventive concepts and spirit of the invention as defined by the following claims.

Therefore, the foregoing description of the exemplary systems and methods for positioning antennas on an aircraft according to this invention is illustrative, and variations in implementation will be apparent and predictable to persons skilled in the art and various changes may be made without departing from the spirit and scope of the invention.

Therefore, although the exemplary embodiments shown in FIGS. 3 and 4 show each antenna mounted on the exterior of an aircraft fuselage, the antennas may be mounted on the exterior of a building, a ship, a car, a bus, or any other type of body. Alternatively, at least one of the antennas is mounted on the interior of the body.

Figure 2:
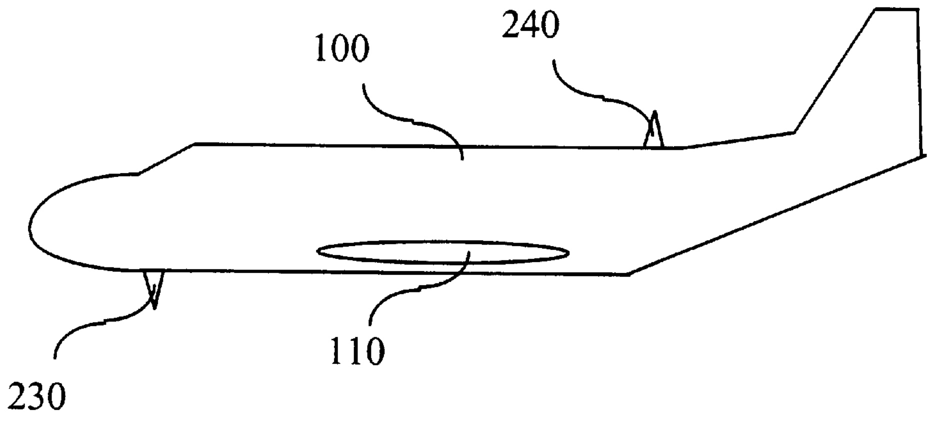
Fig. 2 PRIOR ART
FIG. 2 is a schematic side view of an aircraft incorporating an antenna system according to the prior art.

Additionally, the communication system according to this invention may be combined with any specific location of antennas on the hull, provided that the perimeter to be considered is the shortest clockwise path from a first antenna to a second antenna and return to the first antenna. For example, the "nose to tail" location of antennas 230 and 240 on the fuselage 100 shown in FIG. 2 can easily be combined with the communication system according to this invention.

Also, in the exemplary embodiments of the antenna system of this invention, the antennas may send the same type of signal, for example VHF voice signals. Alternatively, the antennas may emit different type of signals, e.g. VHF voice and UHF data.

Similarly, in certain exemplary embodiments, the first and second antennas are VHF data link antennas or VHF data link transceivers. However, in other exemplary embodiments, other types of antennas are used. For example antennas transmitting signals according to the VDL (VHF Digital Link) standard may be used in specific embodiments of this invention.

Further, although the exemplary embodiments of this invention include first and second antennas positioned away from each other on a body by 180° of the body circumference, offset by a distance of an odd multiple of one quarter of the wavelength of another transmitting antenna on the body, the offset distance need not be exactly an odd multiple of one-quarter the wavelength. For example, the offset distance may be between an odd multiple of one quarter wavelength of a signal transmitted by the first antenna minus one twelfth wavelength and the odd multiple of one quarter wavelength of a signal transmitted by the first antenna plus one twelfth wavelength. In such cases, the received signals traveling along both sides of the fuselage are between 120° and 240° out of phase and the resulting noise signal has an energy which is less than the higher energy of the received signals.

Moreover, the offset distance may be between an odd multiple of one quarter wavelength of a signal transmitted by the first antenna minus one eighth wavelength and the odd multiple of one quarter wavelength of a signal transmitted by the first antenna plus one eighth wavelength. In such cases, the received signals traveling along both sides of the fuselage are between 90° and 270° out of phase.

In particular, the above mentioned offset ranges may be used for designing a specific embodiment of this invention when more than one antenna is a transmitting antenna and more than one wavelengths is used by the transmitting antennas. For example, when two VHF transmitting antennas are used, using wavelengths of approximately 2.27 meters (132 MHz) and approximately 3 meters (100 MHz), those antennas will be preferably positioned so that the difference between the clockwise radio wave path and the counter-clockwise radio wave path is between 0.5675 and 0.75 meters. If this condition is followed, there is a destructive interference between signals arriving from one antenna on the other antenna.

What is claimed is:

1. An antenna system comprising transmitting electronic components, a first transmitting antenna and a second antenna, wherein the first antenna and the second antenna are rotationally positioned asymmetrically and away from each other on a body by 180° around the body offset by an odd multiple of one quarter wavelength of a signal transmitted by the first antenna.

2. The antenna system of claim 1, wherein the odd multiple of one quarter wavelength is equal to one quarter wavelength.

3. The antenna system of claim 1, wherein the body is a fuselage.

4. The antenna system of claim 3, wherein the first antenna and the second antenna are mounted on the exterior of an aircraft fuselage.

5. The antenna system of claim 1, wherein energy produced by the first antenna is out of phase with energy produced by the second antenna.

6. The antenna system of claim 1, wherein the energy transmitted along the body by the first antenna and received along the body by the second antenna cancel each other out.

7. The antenna system of claim 1, wherein relative positioning of the first antenna and the second antenna provides an additional 10 to 30 dB antenna isolation over conventional antenna systems.

8. The antenna system of claim 1, wherein the first antenna and the second and antenna are VHF data link antennas or VHF data link transceivers.

9. The antenna system of claim 1, wherein the first antenna is a VHF data link antenna or a VHF data link transceiver.

10. The antenna system of claim 9, wherein the second antenna is a VHF voice antenna.

11. The antenna system of claim 1, wherein the second antenna is a VHF voice antenna.

12. An antenna system comprising transmitting electronic components, a first transmitting antenna and a second antenna, wherein the first antenna and the second antenna are rotationally positioned asymmetrically and away from each other on a body by half of a perimeter of the body offset by an odd multiple of one quarter wavelength of a signal transmitted by the first antenna.

13. An antenna system comprising transmitting electronic components, a first transmitting antenna and a second antenna, wherein the first antenna and the second antenna are rotationally positioned asymmetrically and away from each other on a body by half of a perimeter of the body offset by a distance between an odd multiple of one quarter wavelength of a signal transmitted by the first antenna minus on twelfth wavelength and the odd multiple of one quarter wavelength of the signal transmitted by the first antenna plus one twelfth wavelength.

14. A method of improving radio frequency isolation between a plurality of antennas mounted on a fuselage, the method comprising:

positioning of a first transmitting antenna of the plurality of antennas at a first position on the fuselage;

positioning of a second antenna of a plurality of antennas at a second position on the fuselage; and transmitting a signal using the first transmitting antenna, wherein the first and second positions are rotationally asymmetric and offset from each other along the fuselage by 180° offset by an odd multiple of one quarter wavelength of the signal transmitted by the first antenna.

15. A method of improving radio frequency isolation between a plurality of antennas mounted on a body, the method comprising:

positioning of a first transmitting antenna of a plurality of antennas at a first position on the body;

positioning of a second antenna of the plurality of antennas at a second position on the body; and transmitting a signal using the first transmitting antenna, wherein the first antenna and the second antenna are rotationally positioned asymmetrically and away from each other on a body by half of a perimeter of the body offset by an odd multiple of one quarter wavelength of the signal transmitted by the first antenna.

16. A method of improving radio frequency isolation between a plurality of antennas mounted on a body, the method comprising:

positioning of a first transmitting antenna of the plurality of antennas at a first position on the body;

positioning of a second antenna of a plurality of antennas at a second position on the body; and transmitting a signal using the first transmitting antenna, wherein the first antenna and the second antenna are rotationally positioned asymmetrically and away from each other on the body by 180° offset by a distance between an odd multiple of one quarter wavelength of a signal transmitted by the first antenna minus one twelfth wavelength and the odd multiple of one quarter wavelength of a signal transmitted by the first antenna plus one twelfth wavelength.

* * * * *